(12) United States Patent
Ko

(10) Patent No.: US 8,506,269 B2
(45) Date of Patent: Aug. 13, 2013

(54) LOW NOISE TYPE BALANCE SHAFT MODULE

(75) Inventor: Gabseok Ko, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 527 days.

(21) Appl. No.: 12/912,414

(22) Filed: Oct. 26, 2010

(65) Prior Publication Data

US 2011/0135527 A1     Jun. 9, 2011

(30) Foreign Application Priority Data

Dec. 3, 2009   (KR) .................. 10-2009-0119201

(51) Int. Cl.
| | |
|---|---|
| F01C 1/30 | (2006.01) |
| F01C 11/00 | (2006.01) |
| F03C 2/00 | (2006.01) |
| F03C 4/00 | (2006.01) |
| F04C 2/00 | (2006.01) |
| F04C 11/00 | (2006.01) |
| F04C 13/00 | (2006.01) |
| F04C 18/00 | (2006.01) |
| F04C 23/00 | (2006.01) |

(52) U.S. Cl.
USPC ............... 418/9; 418/166; 418/171; 418/177

(58) Field of Classification Search
USPC ...................... 418/9, 166, 171, 177
See application file for complete search history.

(56) References Cited

U.S. PATENT DOCUMENTS

| | | | | |
|---|---|---|---|---|
| RE29,230 E | * | 5/1977 | Sarich .......................... | 418/61.1 |
| 4,540,354 A | * | 9/1985 | Tuckey ........................ | 418/15 |
| 6,152,717 A | * | 11/2000 | Morita et al. ................. | 418/171 |
| 7,217,110 B2 | * | 5/2007 | Dreiman ....................... | 418/173 |
| 7,695,250 B2 | * | 4/2010 | Johnson et al. .................... | 417/2 |
| 7,967,580 B2 | * | 6/2011 | Wöckel et al. ................... | 418/21 |
| 8,075,284 B2 | * | 12/2011 | Morita et al. ................. | 417/362 |
| 8,342,815 B2 | * | 1/2013 | Watanabe et al. ............ | 417/213 |
| 8,360,762 B2 | * | 1/2013 | Nunami et al. ............... | 418/150 |
| 2005/0106044 A1 | | 5/2005 | Ohnishi et al. | |
| 2009/0142211 A1 | * | 6/2009 | Holden et al. ..................... | 418/1 |

FOREIGN PATENT DOCUMENTS

| | | |
|---|---|---|
| JP | 61-142380 A | 6/1986 |
| JP | 2005-30290 A | 2/2005 |
| JP | 2007-278183 A | 10/2007 |
| JP | 2009-138754 A | 6/2009 |
| KR | 10-2005-0015774 A | 2/2005 |
| KR | 10-2005-0029500 A | 3/2005 |
| KR | 10-0492857 B1 | 5/2005 |
| KR | 10-2007-0021675 A | 2/2007 |
| KR | 10-0793898 B1 | 1/2008 |
| KR | 10-2008-0055043 A | 6/2008 |

* cited by examiner

Primary Examiner — Thomas Denion
Assistant Examiner — Dapinder Singh
(74) Attorney, Agent, or Firm — Morgan, Lewis & Bockius, LLP

(57) ABSTRACT

A balance shaft module equipped with a dual pump including a main oil pump and a sub-oil pump may include a pump rotor rotatably coupled to a housing, a discharge space formed in the housing for discharging oil in the sub-oil pump, a pulse chamber formed in the housing to increase the discharge space, wherein the oil discharged through the discharge space is merged with the oil flowing through the pulse chamber such that discharge pulse pressure is reduced, and an eccentric washer having a discharging opening space formed by cutting off a portion inward from the outside, wherein the discharge opening space of the eccentric washer is connected to the discharge space to fluid-communicate with the discharge space of the pump rotor.

6 Claims, 5 Drawing Sheets

LOW NOISE TYPE BALANCE SHAFT MODULE

CROSS-REFERENCE TO RELATED APPLICATIONS

The present application claims priority to Korean Patent Application Number 10-2009-0119201 filed Dec. 3, 2009, the entire contents of which application is incorporated herein for all purposes by this reference.

BACKGROUND OF THE INVENTION

1. Field of the Invention

The present invention relates to a balance shaft module, and more particularly, to a low noise type balance shaft module with noise of a sub-oil pump reduced.

2. Description of Related Art

In general, balance shaft modules are an assembly of a balance shaft and an oil pump, which is modulated and fastened to the lower portion of a cylinder block.

The balance shaft attenuates secondary non-uniform force generated reciprocating masses, such as the pistons and a connecting rod of an in-line four cylinder engine and also attenuates secondary vibration due to the secondary non-uniform force, such that it improves acceleration booming.

The balance shaft module is equipped with a dual oil pump including a main oil pump and a sub-oil pump to satisfy lubrication performance of the engine.

The dual oil pump sucks the engine oil from an oil fan in the idle state of the engine, using the main oil pump and the sub-oil pump, and a flow control valve that is opened by pressure of the sucked oil determines the flow rate of the oil discharged to the engine.

Since high engine performance requires higher lubrication performance, the dual oil pump also requires increase of the capacity, but the layout of the main oil pump is limited by the increase of capacity, such that increasing the capacity is not easy.

The sub-oil pump of which the layout is not limited, different from the main oil pump, can use the increase of by-pass pressure due to the increase of pump rotor width and opening pressure. Therefore, it is possible to easily increase the capacity of the dual oil pump by increasing the capacity of the sub-oil pump.

The sub-oil pump re-circulates the oil in the transition section above 7000 RPM and the amount of the oil discharged to the engine due to the increase of capacity is little increased, but it is possible to increase the amount of oil discharged to the engine in the substantial operation section (idle~less than 7000 RPM).

Therefore, it is possible to satisfy the requirement for increasing lubrication performance of the engine having increased performance, in the dual pump equipped with the sub-oil pump having increased capacity.

However, the increase of the oil pump capacity generally increases noise, such that the same phenomenon necessarily occurs in the sub-oil pump.

That is, the increase of capacity of the sub-oil pump increases the pump rotor's moment for pumping the oil and the increase of the pump rotor's moment increases the discharge pulse pressure more increasing the whine noise, and as a result, the whine noise necessarily increases in the sub-oil pump having increased capacity.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a balance shaft module having a sub-oil pump preventing whine noise from being increased by the increase of capacity of the sub-oil pump, by reducing discharge pulse pressure and increasing the amount of discharge of oil, by increasing an oil discharge space of a pump rotor without changing the oil circulation channel therein.

The balance shaft module equipped with a dual pump including a main oil pump and a sub-oil pump may include a pump rotor rotatably coupled to a housing, a discharge space formed in the housing for discharging oil in the sub-oil pump, a pulse chamber formed in the housing to increase the discharge space, wherein the oil discharged through the discharge space is merged with the oil flowing through the pulse chamber such that discharge pulse pressure is reduced, and an eccentric washer having a discharging opening space formed by cutting off a portion inward from the outside, wherein the discharge opening space of the eccentric washer is connected to the discharge space to fluid-communicate with the discharge space of the pump rotor.

The discharge space may have a main discharge channel formed between inner and outer rotors of the pump rotor and the housing, and the pulse chamber communicates with the main discharge channel.

The eccentric washer may have an intake opening space formed by cutting off a portion inward from the outside at one side and the discharge opening space is disposed at the opposite side to the intake opening space, wherein the intake opening space of the eccentric washer is connected to a suction space of the pump rotor.

The discharge opening space may be positioned at the pulse chamber in order not to cover the pulse chamber.

The housing may include an upper housing and a lower housing which are connected each other and the pulse chamber is formed in the upper housing.

According to the exemplary embodiment of the present invention, it is possible to considerably reduce whine noise by reducing discharge pulse pressure even if the capacity of the sub-oil pump increases. Further, it is possible to reduce the discharge pulse pressure by maximum 58%, as compared with the related art, at a middle speed (2700 RPM) and a high speed (6300 RPM) of the engine.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
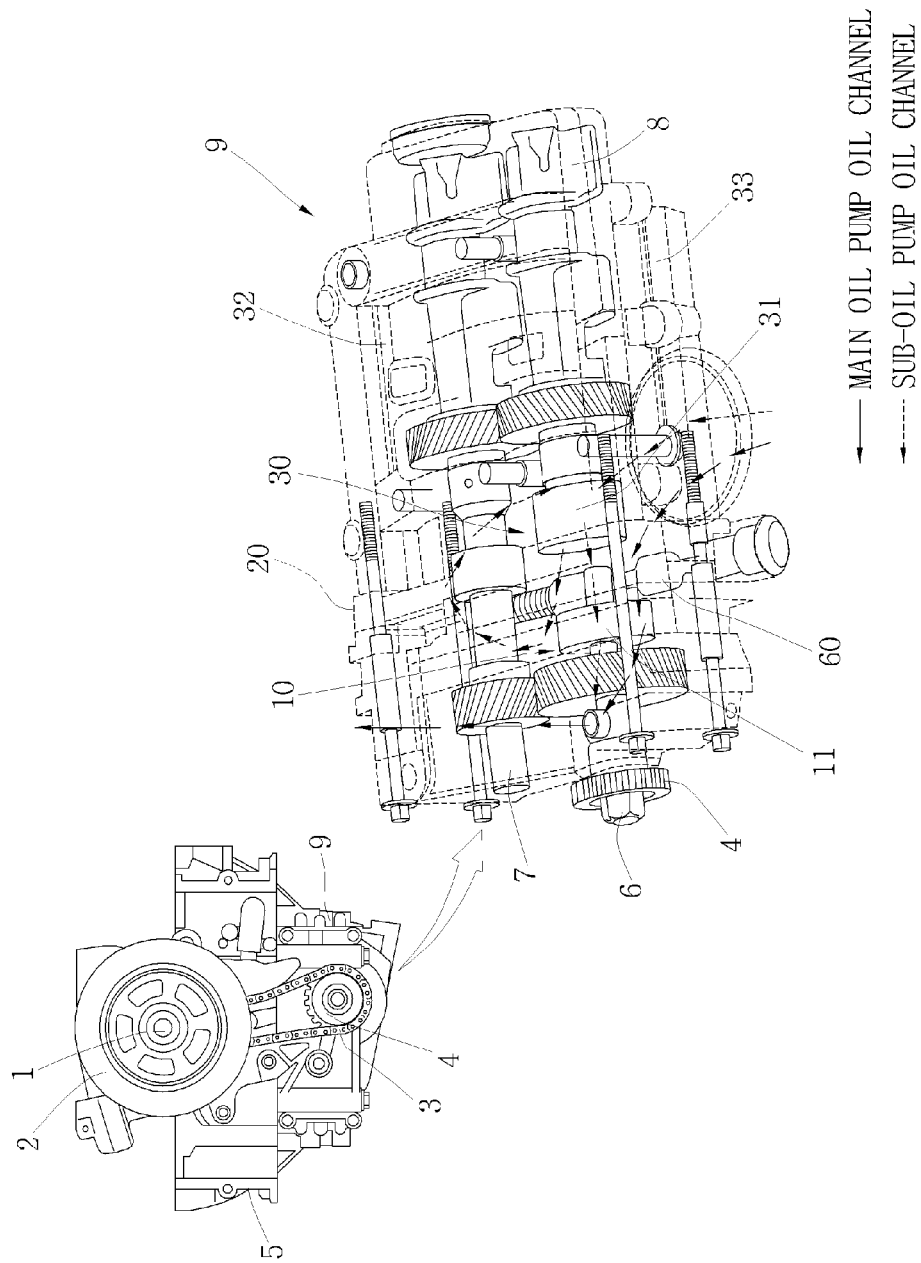
FIG. 1 is a view illustrating the configuration of a low-noise balance shaft module according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a view illustrating the configuration of a low noise typed balance shaft module according to an exemplary embodiment of the present invention, in which a BSM 9 (Balance Shaft Module) that is a balance shaft module of the present invention includes a balance shaft and a duel oil pump (a main oil pump and a sub-oil pump).

BSM 9 is mounted by a ladder frame 5 of an engine.

The balance shaft includes a drive shaft 7 and a driven shaft 8 arranged in parallel and engaged with drive shaft 7 by a transfer gear, in which an integral balance weight is provided to drive shaft 7 and driven shaft 8, respectively.

A balance weight attenuates secondary unbalance force while rotating with drive shaft 7 and driven shaft 8.

An input shaft 6 is engaged with drive shaft 7 and has a sprocket 4 connected with a damper pulley 2 of a crankshaft 1 by a chain 3.

The rotation force of input shaft 6 is transmitted to drive shaft 7 and the rotation force of drive shaft 7 is transmitted to driven shaft 8.

The rotation of drive shaft 7 and driven shaft 8 operates the main oil pump 10 and sub-oil pump 30, respectively.

A pump rotor discharging oil is disposed in main oil pump 10 and sub-oil pump 30 and an eccentric washer 34 reducing discharge pulse pressure and whine noise by increasing the oil discharge space of pump rotor 31 is disposed in sub-oil pump 30.

The oil sucked by the operation of main oil pump 10 and sub-oil pump 30 circulates along an oil channel formed in an inter-housing 20 and is supplied to the engine.

A flow control valve 60 is disposed in the channel through which the sucked oil is supplied to the engine to control the flow of the oil.

An oil flow circuit is formed in the housing accommodating main oil pump 10 and sub-oil pump 30 and connects main oil pump 10 with sub-oil pump 30.

Figure 2:
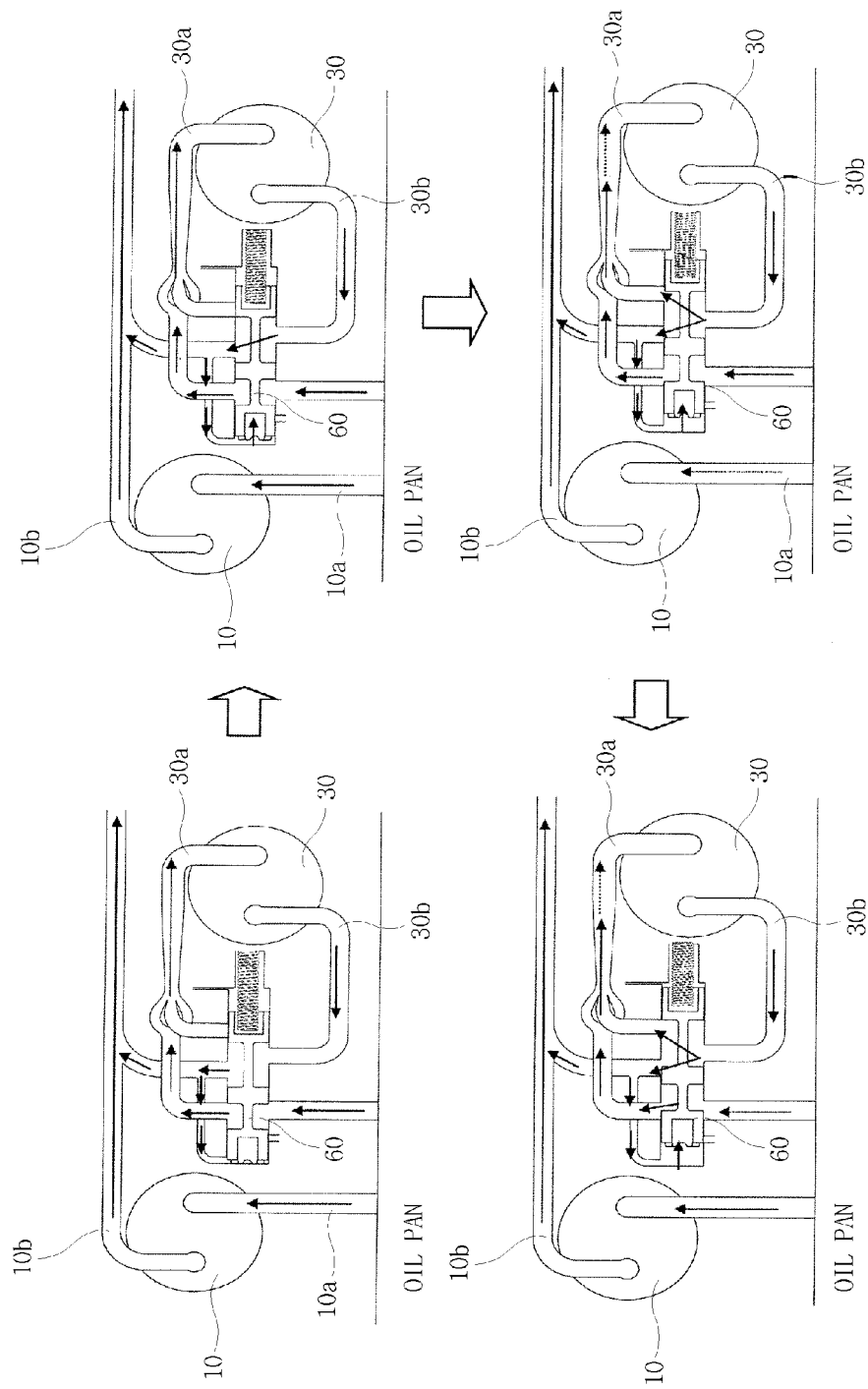
FIG. 2 is a view illustrating oil flow in low-noise sub-oil pump and main pump according to an exemplary embodiment of the present invention.

FIG. 2 shows the flow of oil of the BSM for each revolution of the engine. Referring to FIG. 2, the oil flow circuit at main oil pump 10 includes a oil suction circuit 10a sucking oil from the oil fan when pump rotor 11 rotate and an oil discharge circuit 10b discharging the sucked oil to the engine.

The oil flow circuit at sub-oil pump 30 sucks oil from the oil fan when pump rotor 31 rotates and includes an oil suction circuit 30a forming inner circulation flow in accordance with RPM of the engine and an oil discharge circuit 30b discharging the sucked oil to main oil pump 10.

In the idle state of the engine, main oil pump 10 and sub-oil pump 30 suck the oil into oil suction circuits 10a and 30a and discharge the sucked oil to the engine through oil discharge circuits 10b and 30b, in which flow control valve 60 differently opens in accordance with the pressure of the sucked oil.

After 2500 to 3000 RPM of an engine start transition, some of the oil sucked in sub-oil pump 30 is sent to main oil pump 10 through oil discharge circuit 30b, whereas the other re-circulates by itself.

In this operation, the flow rate of the oil sent to main oil pump 10 is larger than the flow rate of the oil re-circulating by it self in sub-oil pump 30.

However, when the revolution speed of the engine increases and the opening amount of the flow control valve 60 increases, the flow rate of the oil re-circulating by itself in sub-oil pump 30 becomes larger than the flow rate of the oil sent to main oil pump 10, and this operation continues until the engine reaches the complete transition, about 7,000 RPM.

Above about 7000 RPM, which is the transition, by the increase of the revolution number of engine, the flow rate of the oil re-circulating by itself increases in sub-oil pump 30, such that the flow rate of the oil sent to main oil pump 10 correspondingly decreases.

When the revolution speed of the engine reaches a by-pass threshold, the oil in sub-oil pump 30 does not flow to main oil pump 10 and re-circulates by itself only in sub-oil pump 30.

As described above, when the engine is in above the start transition, some of the oil sucked in sub-oil pump 30 re-circulates in sub-oil pump 30 and this recirculation of the oil allows sub-oil pump 30 to function as a variable oil pump, thereby improving fuel efficiency.

Figure 3:
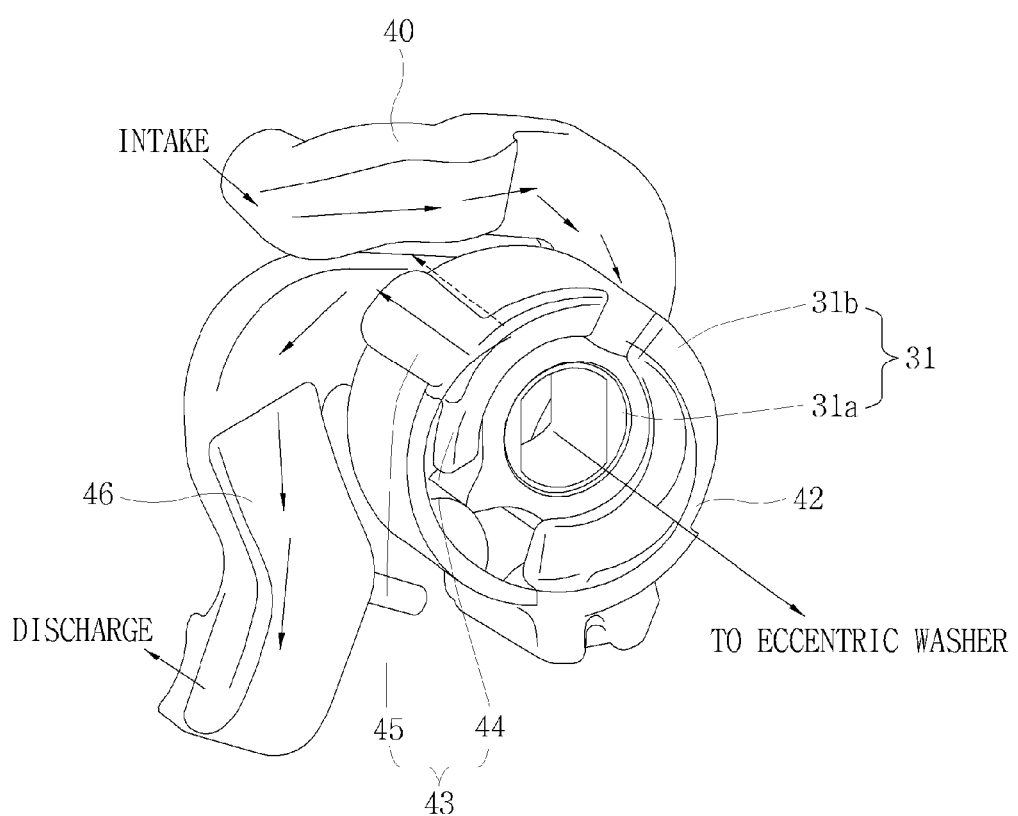
FIG. 3 a view illustrating circulation of oil through a pump rotor of a low noise sub-oil pump according to an exemplary embodiment of the present invention.

FIG. 3 illustrates circulation of oil through a pump rotor of a low noise sub-oil pump according to an exemplary embodiment of the present invention.

As shown in FIG. 3, an oil suction channel 40 guiding the pumped oil into pump rotor 2 is connected to a pump rotor 31 of sub-oil pump 30 and an oil discharge channel 46 discharging the sucked oil to the outside of pump rotor 31.

Oil suction channel 40 and oil discharge channel 46 are formed by inter-housing 20.

Pump rotor 31 includes an inner rotor 31a rotating and an outer rotor 31b surrounding inner rotor 31a, and a suction space 42 for sucking oil and a discharge space 43 for discharging the oil are formed between inner rotor 31a and outer rotor 31b.

Suction space 42 is connected with oil suction channel 40 and discharge space 43 is connected with oil discharge channel 46.

Suction space 42 is formed between inner rotor 31a and outer rotor 31b.

However, discharge space 43 includes a main discharge channel 44 formed between inner rotor 31a and outer rotor 31b and a pulse chamber 45 formed on the wall of an upper housing 32 accommodating pump rotor 31 to increase the space of main discharge channel 44.

Accordingly, the flow rate of the oil discharged to oil discharge channel 46 through discharge space 43 is merged with the flow late of the oil flowing through main discharge channel 44 and the flow rate of the oil flowing through pulse chamber 45, and this operation allows pump rotor 31 to discharge relatively large flow rate of oil to increased discharge space 43 and reduce discharge pulse pressure.

Figure 4:
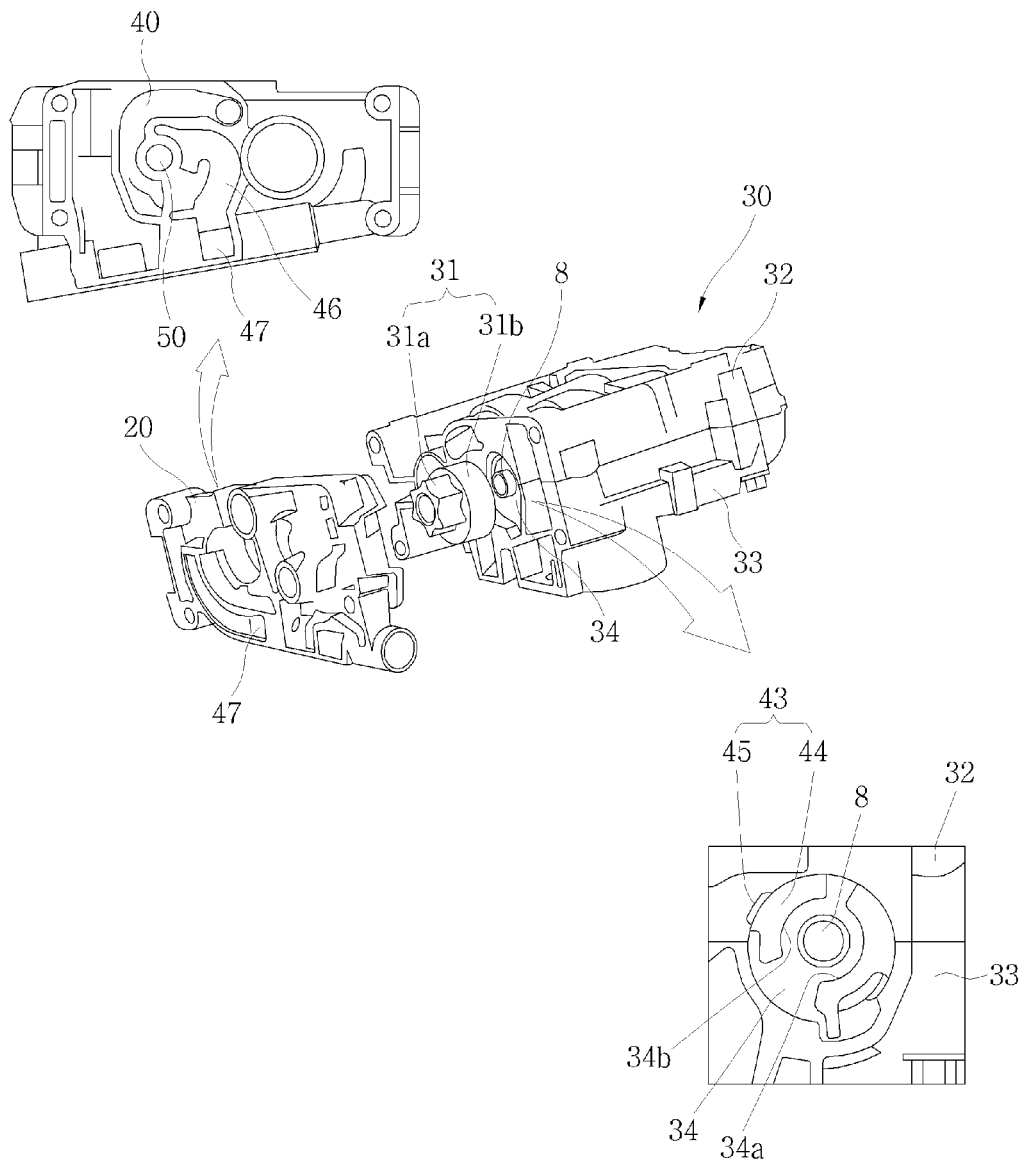
FIG. 4 is an exploded view illustrating the configuration of the low noise sub-oil pump shown in FIG. 3.

FIG. 4 is an exploded view showing the configuration of a low noise sub-oil pump according to an exemplary embodiment of the present invention.

As shown in FIG. 4, eccentric washer 34 and pump rotor 31 of sub-oil pump 30 is accommodated inside upper housing 32 and lower housing 33 combined together. Further, eccentric washer 34 and pump rotor 31 are fixed to driven shaft 8.

Inter-housing 20 is assembled to upper housing 32 and lower housing 33 and a communication channel 47 for sending the oil of sub-oil pump 30 to main oil pump 10 is formed through inter-housing 20.

A center groove 50 is formed on the axial line of pump rotor 31 in inter-housing 20, oil suction channel 40 is formed at a side from center groove 50, oil discharge channel 46 is formed at the opposite side, and communication channel 47 communicates with the end of oil discharge channel 46.

The entire shape of oil suction channel 40 and oil discharge channel 46 is the same shown in FIG. 3.

Eccentric washer 34 is accommodated, in close contact with pump rotor 31, at pump rotor space 32a of combined upper housing 32 and lower housing 33, and fixed to driven shaft 8.

Eccentric washer 34 has an intake opening space 34a formed by cutting a portion inward from the outside at one side of eccentric washer 34 and a discharge opening space 34b formed by cutting a portion inward from the outside at the opposite side of intake opening space 34a.

When eccentric washer 34 is assembled with pump rotor 31, intake opening space 34a of eccentric washer 34 is connected to suction space 42 of pump rotor 31 and discharge opening space 34b of eccentric washer 34 is connected to discharge space 43 of pump rotor 31.

Discharge opening space 34b is formed such that pulse chamber 45 of discharge space 43 in pump rotor 31 is not covered.

Figure 5:
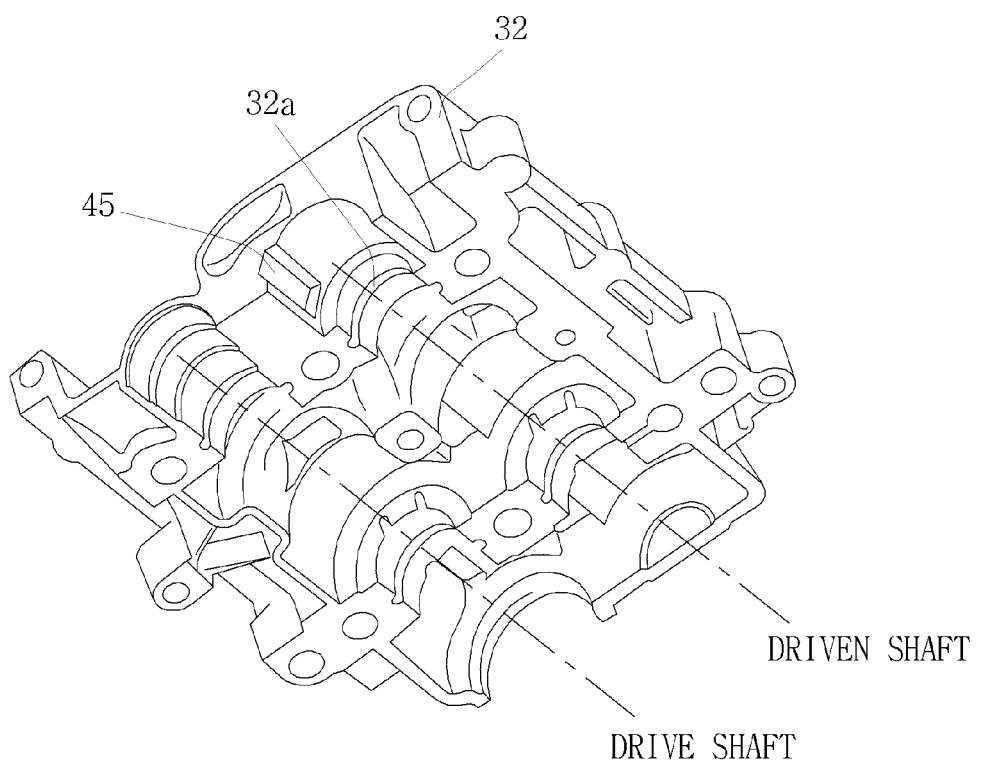
FIG. 5 is a view illustrating the configuration of an upper housing for reducing pulse pressure of a low-noise sub-oil pump according to an exemplary embodiment of the present invention.

FIG. 5 is a view showing the structure of the upper housing for reducing pulse pressure of low noise sub-oil pump.

As shown in FIG. 5, pump rotor space 32a accommodating the upper portion of pump rotor 31 which is fixed to driven shaft 8 is formed in upper housing 32 and a pulse chamber 45 formed by cutting off the wall of pump rotor space 32a is further formed in pump rotor space 32a.

Upper housing 31 and lower housing 33 are combined and FIG. 4 shows the assembly in which pump rotor 31 is accommodated in housings 32, 33, in which pulse chamber 45 defines discharge space 43 with main discharge channel 44 and discharge space 43 is provided in sub-oil pump 30.

Accordingly, in sub-oil pump 30 according to an exemplary embodiment of the present invention, the oil flowing inside by the rotation of pump rotor 31 flows into discharge space 43 at the opposite side through intake opening space 34a of eccentric washer 34 and suction space 42 of pump rotor 31. The oil flowing in discharge space 43 is discharged to oil discharge channel 46 communicating with discharge space 43.

When the oil is discharged to oil discharge channel 46 through discharge space 43, main discharge channel 44 of discharge space 43 functions as a channel allowing most of the oil to be discharged and pulse chamber 45 functions as a channel allowing the rest of the oil, which is not discharged to main discharge channel 44, to be discharged.

Accordingly, since sub-oil pump 30 has discharge space 43 expended to pulse chamber 45, it is possible to reduce the discharge pulse pressure while increasing the discharge flow rate of the oil. Further, it is possible to reduce the discharge pulse pressure of about experimentally maximum 58%, as compared with discharge space 43 only having main discharge channel 44 without pulse chamber 45.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A balance shaft module equipped with a dual pump including a main oil pump and a sub-oil pump, the balance shaft module comprising:
   a pump rotor rotatably coupled to a housing;
   a discharge space formed in the housing for discharging oil in the sub-oil pump;
   a pulse chamber formed in the housing to increase the discharge space, wherein the oil discharged through the discharge space is merged with the oil flowing through the pulse chamber such that discharge pulse pressure is reduced; and
   an eccentric washer having a discharging opening space formed by cutting off a portion inward from the outside, wherein the discharge opening space of the eccentric washer is connected to the discharge space to fluid-communicate with the discharge space of the pump rotor.

2. The balance shaft module as defined in claim 1, wherein the discharge space has a main discharge channel formed between inner and outer rotors of the pump rotor and the housing, and the pulse chamber communicates with the main discharge channel.

3. The balance shaft module as defined in claim 1, wherein the eccentric washer has an intake opening space formed by cutting off a portion inward from the outside at one side and the discharge opening space is disposed at the opposite side to the intake opening space.

4. The balance shaft module as defined in claim 3, wherein the intake opening space of the eccentric washer is connected to a suction space of the pump rotor.

5. The balance shaft module as defined in claim 1, wherein the discharge opening space is positioned at the pulse chamber in order not to cover the pulse chamber.

6. The balance shaft module as defined in claim 1, wherein the housing includes an upper housing and a lower housing which are connected each other and the pulse chamber is formed in the upper housing.

* * * * *